Figure 1:
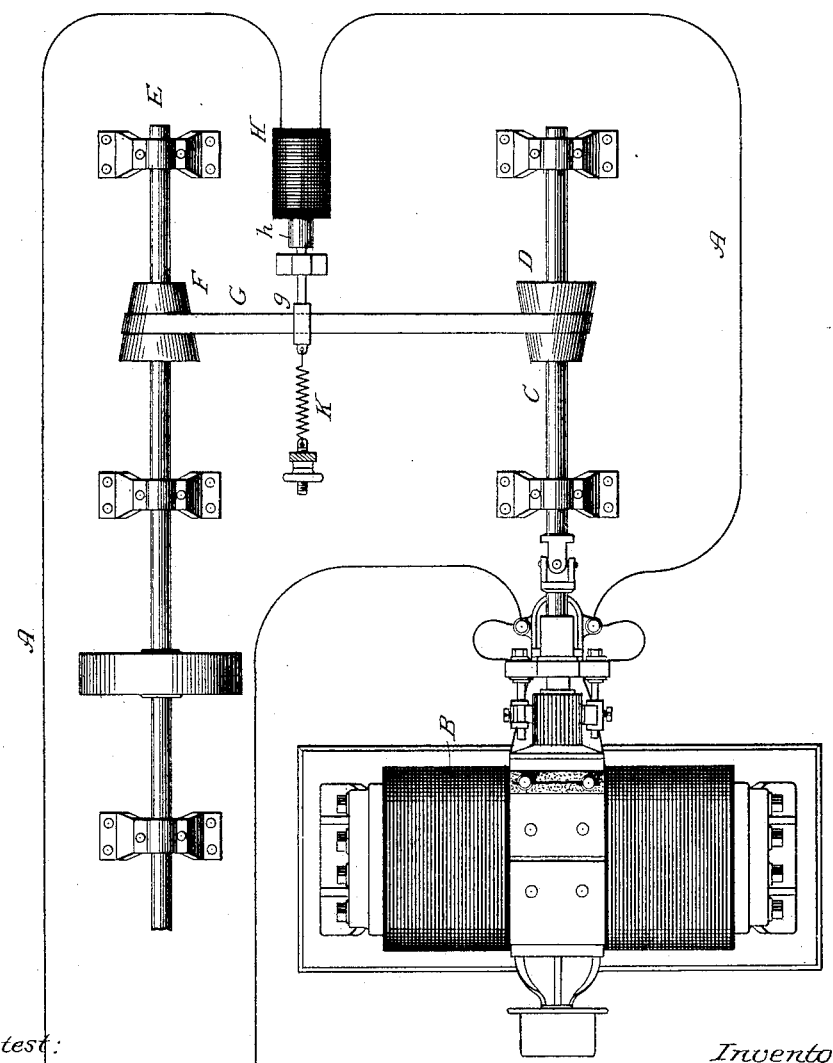

(No Model.)  4 Sheets—Sheet 1.

E. WESTON.
DEVICE FOR REGULATING THE ELECTRICAL TRANSMISSION OF POWER.

No. 272,363.  Patented Feb. 13, 1883.

Attest:
Raymond F. Games
Henry A. Beckmeyer

Inventor:
Edward Weston
By Parker W. Page
Atty.

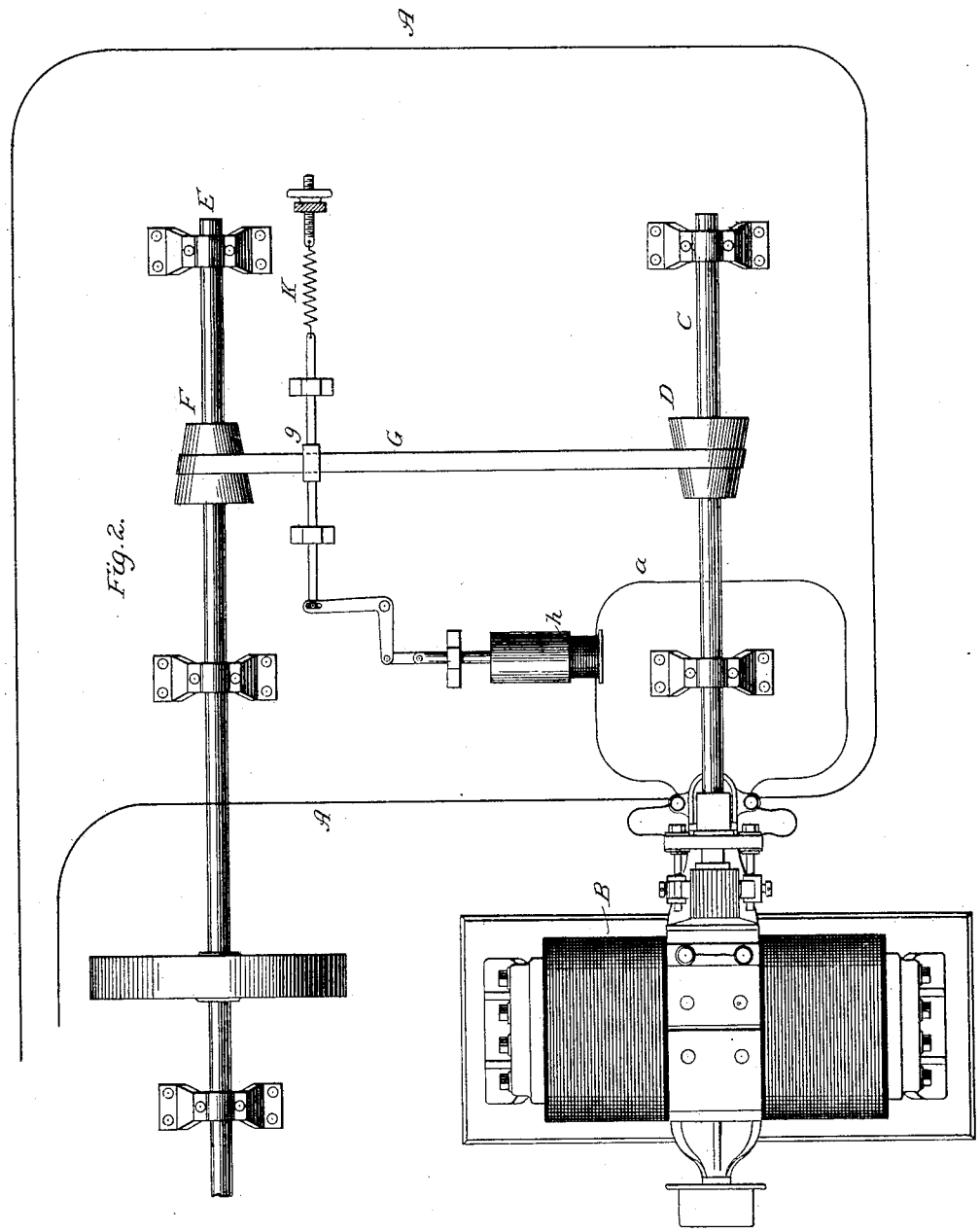

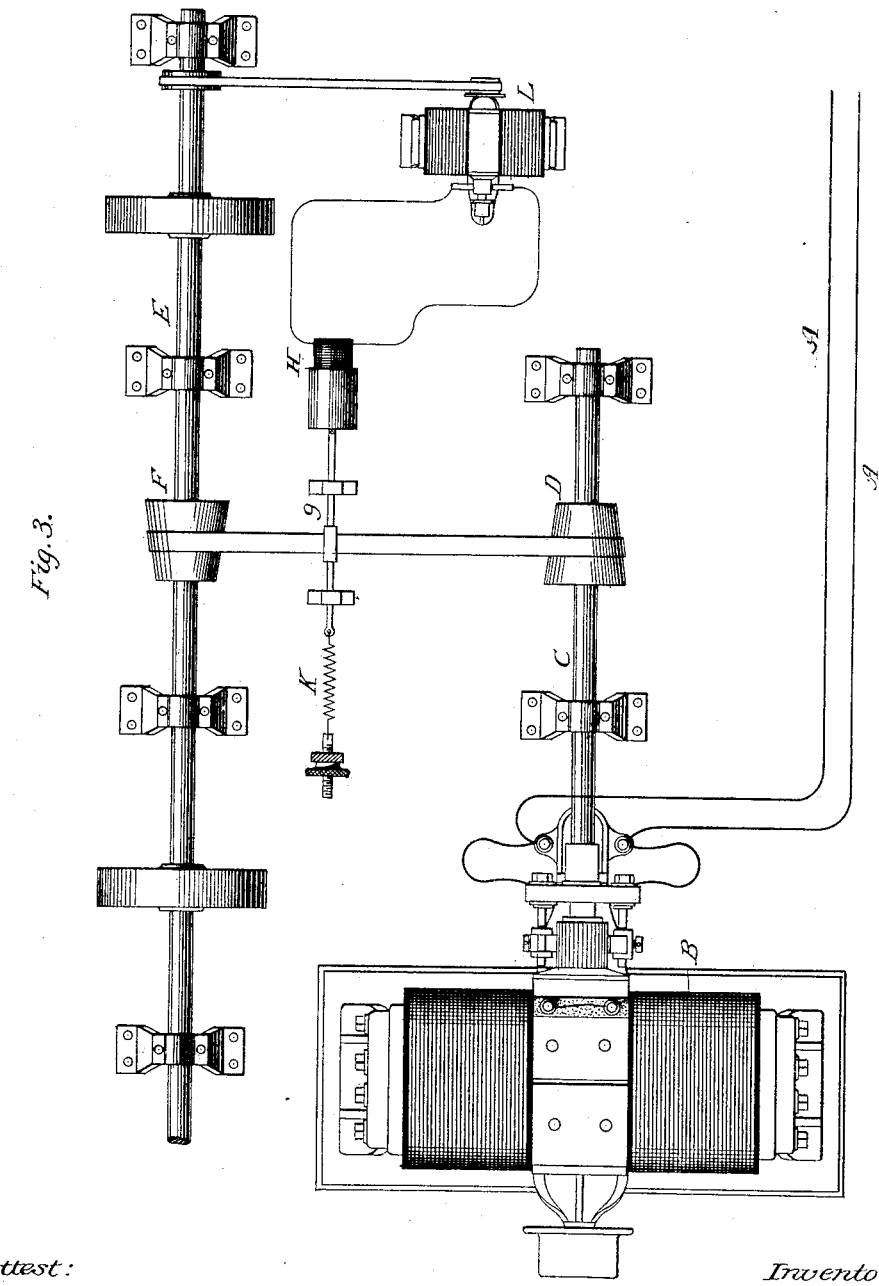

(No Model.) 4 Sheets—Sheet 4.
E. WESTON.
DEVICE FOR REGULATING THE ELECTRICAL TRANSMISSION OF POWER.
No. 272,363. Patented Feb. 13, 1883.
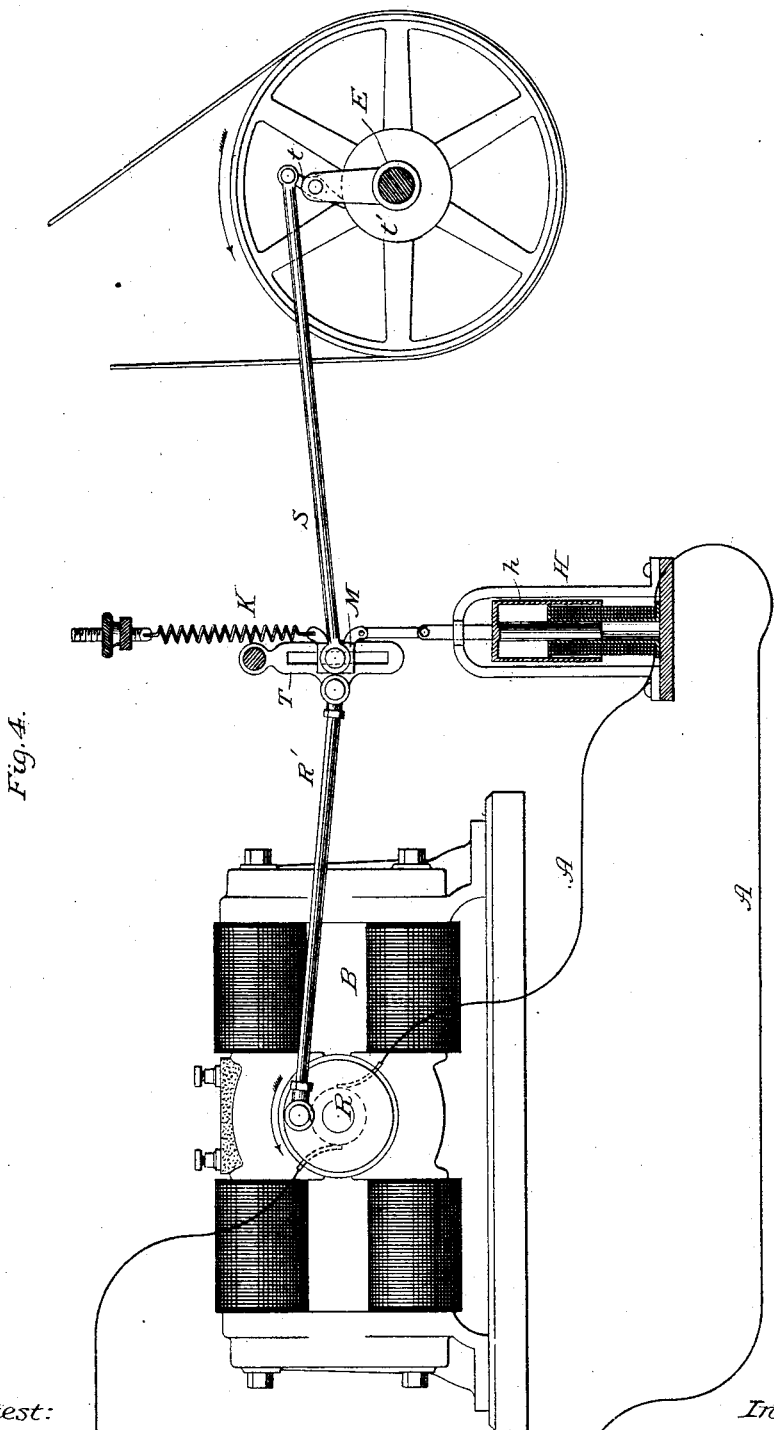

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DEVICE FOR REGULATING THE ELECTRICAL TRANSMISSION OF POWER.

SPECIFICATION forming part of Letters Patent No. 272,363, dated February 13, 1883.

Application filed October 24, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Devices for Regulating the Electrical Transmission of Power, of which the following is a specification, reference being had to the drawings accompanying and forming a part of the same.

In other applications filed by me I have shown and described a combination, with a motor, a driven shaft or machine, and devices for transmitting motion from the one to the other, of certain mechanical appliances for varying the action or effect of the said motion-transmitting devices, whereby the speed of the driven machine is maintained practically uniform, while that of the motor is permitted to vary.

In my present application I shall, after pointing out the general theory upon which this invention depends, describe a system designed for the accomplishment of a similar purpose, but in which the varying attraction of an electro magnet or magnets is relied upon to produce the requisite changes in the action of the motion-transmitting devices.

In the electrical transmission of power by means of electromotors in circuit with one or more generators which supply the current for operating them, the speed of the electromotor varies with variations in its load or the amount of work which it is called upon to do. If, for example, the electromotor is employed to drive a line-shaft from which several machines are driven, whenever one or more of the machines driven by the line-shaft are disconnected therefrom the load upon the electromotor is diminished, and its speed of rotation tends to correspondingly increase. An increase in the speed of rotation of the motor involves of course a like increase in the speed of rotation of the line-shaft which the motor drives. It has been heretofore sought to automatically prevent this increase in speed of rotation by governing the speed of the motor, this being usually attempted by the introduction of resistance, or its equivalent, into the main or field circuit of the generator supplying the current for driving the motor whenever the motor is relieved from portions of its load. It has also been proposed to automatically open the circuit whenever the speed of the motor rises or falls to a predetermined point; but inasmuch as both of these expedients involve the employment of electrical appliances more or less expensive and intricate in proportion to their efficiency, they are open to many objections and difficulties. When an electro-magnetic motor is included in the circuit with a dynamo-electric generator, it develops in the circuit an electro-motive force opposed to that of the generator. Assuming, by way of illustration, that the generator and motor are of the same character and capacity, and disregarding entirely the retarding effects of friction, the resistance of the conductors connecting the two machines, and also the internal resistance of the machines themselves, it is evident that so long as the electro-motive force of the generator preponderates over the counter electro-motive force of the motor, an amount of current energy represented by the difference of the two electro-motive forces will be transformed into the work of revolving the armature of the motor. The speed of the driven machine or motor will in consequence be increased, the tendency being toward the attainment of that rate of speed necessary to make its electro-motive force equal to that of the generator. If the motor is now made to do some work—as, for example, to drive another machine—its speed of rotation, and consequently its counter electro-motive force, fall, and there is an increase in the amount of current energy manifested, which increase is proportionate to the amount of the added work. As a matter of fact, the disturbing elements of friction and resistance affect to a greater or less extent this law of operation, without, however, changing materially the general result; and it is evident from the above that the motor, if permitted to vary its speed of rotation according to the amount of work put upon it, is capable of automatically governing the amount of current flowing, or, more properly speaking, the amount of current energy transformed into work. By my invention this capacity of the motor is made use of as the means of automatically governing the amount of current energy transformed or expended, and I effect this result by operating on the motor transmitting devices that connect the motor with the machine or shaft driven thereby, varying the action or effect of said devices in such manner as to maintain the speed of the driven machine constant, while permitting the motor to revolve at a varying speed that is determined by its load. My present invention involves means for accomplishing this result mainly through the agency of electro-magnets or similar electrical devices; and it consists in the combination, under conditions hereinafter presented, of an electro magnet or magnets with the devices that transmit the motion of the motor to the driven shaft or machine, whereby the action or effect of said transmitting devices is varied proportionately to variations in the attractive force of the magnets.

In the drawings hereto annexed the figures are designed as diagrams illustrative of various applications of magnets for purposes of regulation.

In Figure 1 is represented a circuit, A A, and a motor, B, included therein. A shaft, C, forming either a prolongation of the motor-shaft or coupled with it, carries a cone-pulley, D. The driven shaft or machine is represented by the letter E. It also carries a cone-pulley, F. G is the belt running on the two pulleys. H is an electro-magnet or helix; h, its armature or core. The core h is connected with a slide, g, or other simple form of belt-shifter. An adjustable spring, K, is fixed to the end of slide g, and acts in opposition to the magnet.

Instead of spring K, a weight, a magnet in a shunt-circuit about the motor, or other equivalent opposing force may be used.

It has already been shown that a decrease in the speed of the motor, due to the addition of a load, is attended by a decrease in the counter electro-motive force and a corresponding increase in the amount of current flowing or current energy expended. This being the case, the attraction of magnet H becomes greater as the speed of the motor decreases, and shifts the belt toward the larger end of pulley D, so that a uniform speed may be imparted to the shaft E, though the motor be allowed to slow down. On the other hand, as the speed and counter electro-motive force increase the attraction of magnet H decreases, the spring in such event operating to withdraw the core h and shift the belt G to the smaller end of pulley D. Fig. 2 shows a modification of this idea. In all respects the devices in this figure are similar to those in Fig. 1, with the exception that the magnet h is included in a shunt, a, about the motor, and is arranged on the opposite side of the belt. The counter electro-motive force of the motor acts in practically the same manner as resistance. The greater the amount of counter electro-motive force, therefore, the greater will be the amount of current diverted through the shunt a. The speed of the motor being determined by the load imposed upon it, the attractive force of magnet H will be varied directly as the speed of the motor, and will operate to shift the belt G either directly or by intermediate connecting-levers, and effect the requisite regulation. The same results are attained in whatever way the attractive force of magnet H be acquired, provided it correspond to variations in the speed of the motor. For example, in Fig. 3 the magnet H is energized by a current from a small dynamo, L, driven by the shaft E. It will be seen in this case that the amount of current developed by the machine L is determined by the load on shaft E, and that it operates to preserve the speed of the shaft uniform.

Fig. 4 is a representation of a modified form of motion-transmitting device. The driven shaft E is here rotated by means of a friction-pawl, t, operating on a disk, t', fixed to the shaft. The pawl t is oscillated by the motor B, the rotary motion of the latter being converted into reciprocating for this purpose by a crank-wheel, R, and transmitted by rod R' to a swinging bar, T. A second rod, S, is pivoted to the friction-pawl t and to a slide, M, arranged to move vertically in a slot in bar T. An electro-magnet, H, is included in the motor-circuit. Its armature h is connected to the slide M, and a spring, K, connected also to the slide, acts in opposition to the attraction of the magnet. The vertical position of the slide M determines the length of the stroke of the rod S and friction-pawl. This position may obviously be varied, according to the speed of the motor, by the magnet H, since the attraction of the magnet will itself depend upon the speed of the motor. This plan may be modified by employing a shunt-magnet to raise the slide and a spring to draw it down, and so in many other ways, a number of which are obvious deductions from the means I have now described. The motion-transmitting devices may be varied by means of one or more electro-magnets to produce the desired result, a uniform speed in the driven shaft, while the speed of the motor is free to vary according to the load.

Though not claiming, specifically, all the devices herein shown and described, I reserve the right to do so in other applications.

What I however claim herein is—

1. In systems for the electrical transmission of power, the combination, with an electric motor, a driven machine and motion, transmitting devices connecting the same, of an electro magnet or magnets the attraction of which is caused to depend upon variations in the speed of the motor, and intermediate connections whereby the action or effect of the motion-transmitting devices is varied in substantially the manner herein set forth.

2. In a system for the electrical transmission of power, the combination, with an electric motor, a driven shaft or machine, and motion-transmitting devices, of an electro-magnet and intermediate connections, the said magnet being connected with the motor-circuit, as described, whereby the action or effect of the motion-transmitting devices is varied, as set forth.

In testimony whereof I have hereunto set my hand this 21st day of October, 1882.

EDWARD WESTON.

Witnesses:
HENRY A. BECKMEYER,
PARKER W. PAGE.